US012040565B2

(12) United States Patent
Leung et al.

(10) Patent No.: US 12,040,565 B2
(45) Date of Patent: Jul. 16, 2024

(54) OMNIDIRECTIONAL ANTENNA

(71) Applicant: City University of Hong Kong, Kowloon (HK)

(72) Inventors: Kwok Wa Leung, Kowloon (HK); Peng Fei Hu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 318 days.

(21) Appl. No.: 17/683,609

(22) Filed: Mar. 1, 2022

(65) Prior Publication Data

US 2023/0282982 A1 Sep. 7, 2023

(51) Int. Cl.

| | |
|---|---|
| ***H01Q 9/04*** | (2006.01) |
| ***H01Q 1/38*** | (2006.01) |
| ***H01Q 21/00*** | (2006.01) |
| ***H01Q 21/20*** | (2006.01) |

(52) U.S. Cl.
CPC ............. *H01Q 9/0485* (2013.01); *H01Q 1/38* (2013.01); *H01Q 21/0006* (2013.01); *H01Q 21/205* (2013.01)

(58) Field of Classification Search
CPC .... H01Q 9/0485; H01Q 1/38; H01Q 21/0006; H01Q 21/205
See application file for complete search history.

(56) References Cited

U.S. PATENT DOCUMENTS

| | | | | |
|---|---|---|---|---|
| 7,042,403 | B2 | 5/2006 | Colburn et al. | |
| 8,179,330 | B2 | 5/2012 | Waltho | |
| 8,368,609 | B2 | 2/2013 | Morrow et al. | |
| 8,779,998 | B1 | 7/2014 | Pickles | |
| 8,988,298 | B1 | 3/2015 | Akhoondzadehasl et al. | |
| 10,812,749 | B2 | 10/2020 | Yang | |
| 10,923,818 | B2 * | 2/2021 | Leung ...................... | H01Q 1/38 |

OTHER PUBLICATIONS

Jovic et al., Annular dielectric resonator-based antenna for multi-frequency GNSS applications, 13th European Conference on Antennas and Propagation (Year: 2019).*

* cited by examiner

*Primary Examiner* — David E Lotter
(74) *Attorney, Agent, or Firm* — Renner, Kenner, Greive, Bobak, Taylor & Weber

(57) ABSTRACT

A omnidirectional antenna includes a substrate; a dielectric resonator element arranged on the substrate; a feed circuit operably coupled with the dielectric resonator element and operable to facilitate operation of the omnidirectional antenna in a first frequency band; and a feed probe operably coupled with the dielectric resonator element and operable to facilitate operation of the omnidirectional antenna in a second frequency band different from the first frequency band.

22 Claims, 6 Drawing Sheets

OMNIDIRECTIONAL ANTENNA

TECHNICAL FIELD

The invention relates to an omnidirectional antenna and a related antenna array.

BACKGROUND

Omnidirectional antennas can generally provide a relatively broad coverage hence are suitable for indoor wireless communication applications. Conventionally, for dual-frequency or dual-frequency-band applications, two omnidirectional antennas, each arranged to operate at a respective frequency or frequency band, are employed. The two omnidirectional antennas have to be placed separately away from each other to reduce or minimize the effect or interference of the operation of the two antennas, and this placement results in a relatively bulky antenna assembly (e.g., with a relatively large size or footprint).

SUMMARY

In a first aspect, there is provided an omnidirectional antenna, comprising: a substrate; a dielectric resonator element arranged on the substrate; a feed circuit operably coupled with the dielectric resonator element and operable to facilitate operation of the omnidirectional antenna in a first frequency band; and a feed probe operably coupled with the dielectric resonator element and operable to facilitate operation of the omnidirectional antenna in a second frequency band different from the first frequency band. The omnidirectional antenna can radiate similar or generally the same radio power for the first frequency band in directions perpendicular to an axis. The omnidirectional antenna can radiate similar or generally the same radio power for the second frequency band in directions perpendicular to the axis. The omnidirectional antenna may operate in transmission mode and optionally in receiving mode.

Optionally, the first frequency band is spaced apart from (i.e., do not overlap with) the second frequency band.

Optionally, the first frequency band comprises a sub-6 GHz frequency band, e.g., of the 5G spectrum. Optionally, the second frequency band comprises a millimeter-wave frequency band, e.g., of the 5G spectrum. The sub-6 GHz frequency band may correspond to any frequency band below 6 GHz, e.g., the 3.5 GHz band between about 3.55 to 3.7 GHz. The millimeter-wave frequency band may include any millimeter-wave frequency range above 24 GHz, within 24 GHz to 54 GHz, or within 24 GHz to 4*o* GHz.

Optionally, the feed circuit and the feed probe are arranged to operate simultaneously to facilitate simultaneous operation of the omnidirectional antenna in the first frequency band and the second frequency band.

Optionally, the substrate, e.g., a PCB substrate, is a single-layer substrate. The substrate may be in the form of a disc, e.g., a circular or annular disc.

Optionally, the dielectric resonator element comprises a body with a hole, and the feed probe is arranged at least partly in the hole. The feed probe may be arranged partly or entirely inside the hole.

Optionally, the hole is a through-hole. The through-hole may be cylindrical.

Optionally, the hole is arranged centrally of the body.

Optionally, the body with the hole is in the form of an annular cylinder. The annular cylinder may be formed by wall with substantially the same thickness. Alternatively the body may be in the form of a cube, a prism, a rectangular prism, a triangular prism, a sphere, a cone, a pyramid, etc., with a hole, such as a through-hole.

Optionally, the dielectric resonator element is made at least partly of glass material. The dielectric resonator element may be made entirely of glass material. The glass material may be optical glass such as borosilicate crown glass (e.g., K9 glass, BK-7 glass, etc.).

Optionally, the dielectric resonator element is made of transparent or translucent dielectric material.

Optionally, the feed probe extends generally perpendicular to the substrate.

Optionally, the body and/or the hole of the dielectric resonator element has a first axial length and the second probe has a second axial length smaller than the first axial length.

Optionally, the feed probe comprises an impedance bandwidth enhancement portion. Optionally, the feed probe further comprises a cylindrical portion connected with the impedance bandwidth enhancement portion. A cross sectional perimeter of the cylindrical portion is smaller than a cross sectional perimeter of any cross section of the impedance bandwidth enhancement portion. The feed probe may further include further portion(s).

Optionally, the impedance bandwidth enhancement portion comprises a generally tapering portion that tapers to generally widen away from the substrate. The generally tapering portion refers to a portion that has a tendency to taper from one end towards another end—it includes a narrower end and a wider end and a transition between the narrower end and the wider end that can but need not be strictly continuously widening. The impedance bandwidth enhancement portion may be arranged entirely within the hole of the body of the dielectric resonator antenna.

Optionally, the generally tapering portion comprises a conical portion or a frusto-conical portion that tapers to widen away from the substrate.

Optionally, the feed probe is arranged coaxially with the hole.

Optionally, the feed probe is arranged generally centrally of the hole without touching wall portion of the dielectric resonator element that defines the hole.

Optionally, the feed probe is made at least partly of metallic material.

Optionally, the feed probe is a metallic probe.

Optionally, the omnidirectional antenna further comprising a port connected with the feed probe and for connection with a feed (e.g., co-axial cable). Optionally, the dielectric resonator element and the port are arranged on opposite sides of the substrate.

Optionally, the feed circuit comprises conductors (e.g., conductor strips).

Optionally the feed circuit is printed on the substrate.

Optionally, the conductor strips are printed on the substrate.

Optionally, the conductor strips define, at least, a power divider circuit and a plurality of arc-shaped conductive segments operably connected with the power divider circuit. In one example the power divider circuit is a 1-to-4 power divider circuit and the plurality of arc-shaped conductive segments are comprised of 4 segments. The plurality of arc-shaped conductive segments may or may not be of the same shape and form (e.g., arc curvature) and/or size (e.g., arc length).

Optionally, the plurality of arc-shaped conductive segments are disposed between, e.g., sandwiched between, the substrate and the dielectric resonator element.

Optionally, the plurality of arc-shaped conductive segments are angularly spaced apart. The arc-shaped conductive segments may be angularly spaced apart generally equally.

Optionally, the plurality of arc-shaped conductive segments are arranged on an annular path (a trajectory).

Optionally, the omnidirectional antenna further comprises a port operably connected with the power divider circuit and for connection with a feed (e.g., co-axial cable). Optionally, the dielectric resonator element and the port are arranged on opposite sides of the substrate.

Optionally, the omnidirectional antenna is a dual-frequency-band antenna. In other words, the omnidirectional antenna is only operable in the first and second frequency bands.

Optionally, the omnidirectional antenna is a multiple-frequency-band antenna arranged to operate in more than two frequency bands (in one or more frequency bands other than the first and second frequency bands; the one or more frequency bands are different from, and optionally spaced apart from, the first and second frequency bands).

In a second aspect there is provided an antenna array comprising a plurality of the omnidirectional antenna of the first aspect.

In a third aspect, there is provided an antenna array comprising a substrate and a plurality of antenna units. Each of the antenna units includes: a dielectric resonator element arranged on the substrate; a feed circuit operably coupled with the dielectric resonator element and operable to facilitate operation of the omnidirectional antenna unit in a first frequency band; and a feed probe operably coupled with the dielectric resonator element and operable to facilitate operation of the omnidirectional antenna unit in a second frequency band different from the first frequency band.

In a fourth aspect, there is provided a communication device or system that includes the omnidirectional antenna of the first aspect. The communication device or system may include or be a 5G (or above) wireless communication device or system. The communication device or system may be an indoor communication device or system arranged for indoor use. The communication device or system may include a router.

In a fifth aspect, there is provided a communication device that includes the antenna array of the second aspect. The communication device or system may include or be a 5G (or above) wireless communication device or system. The communication device or system may be an indoor communication device or system arranged for indoor use. The communication device or system may include a router.

In a sixth aspect, there is provided a communication device that includes the antenna array of the third aspect. The communication device or system may include or be a 5G (or above) wireless communication device or system. The communication device or system may be an indoor communication device or system arranged for indoor use. The communication device or system may include a router.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are, depending on context, used to take into account manufacture tolerance and/or artefacts, degradation, wearing, trend, tendency, etc.

BRIEF DESCRIPTION OF THE DRAWINGS

Embodiments of the invention will now be described, by way of example, with reference to the accompanying drawings in which.

DETAILED DESCRIPTION

Figure 1:
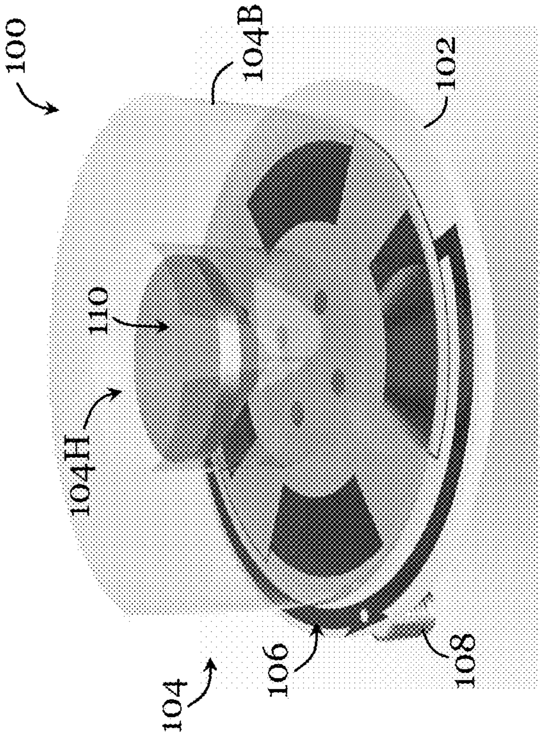
FIG. 1 is a schematic diagram of an omnidirectional antenna in one embodiment.
Figure 2:
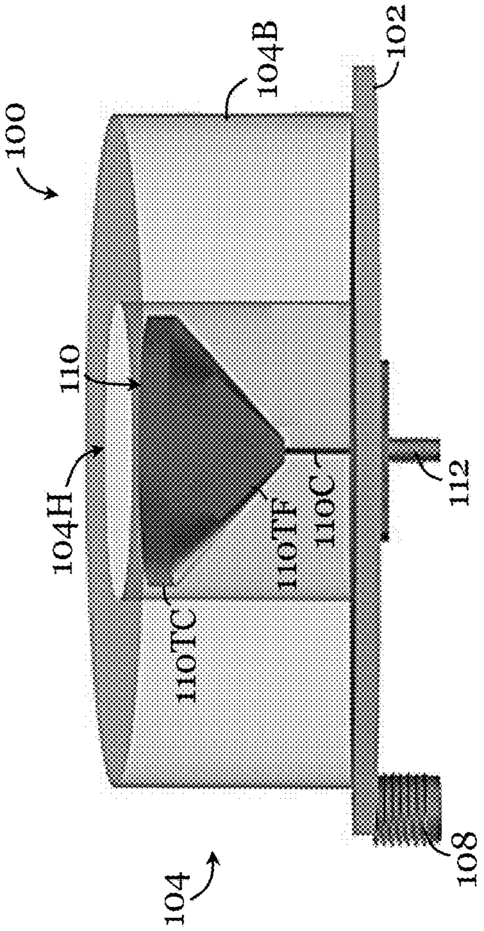
FIG. 2 is a side view of the omnidirectional antenna of FIG. 1.
Figure 4:
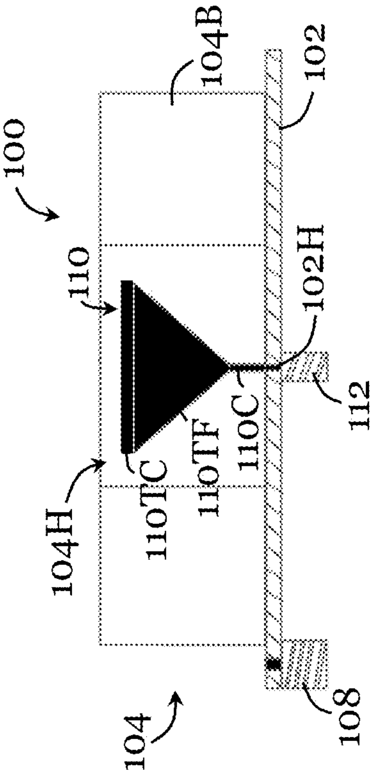
FIG. 4 is a sectional view of the omnidirectional antenna of FIG. 1.
Figure 3:
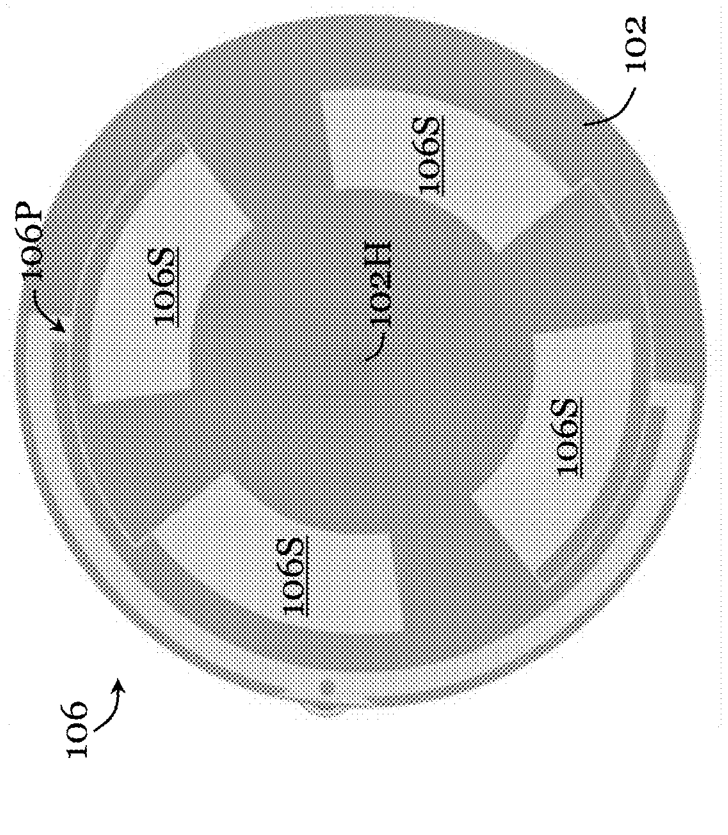
FIG. 3 is a plan view of the substrate and feed circuit of the omnidirectional antenna of FIG. 1.

FIGS. 1 to 4 show a dual-frequency-band omnidirectional antenna 100 in one embodiment of the invention. In this embodiment the antenna 100 is arranged to operate in, at least, a sub-6 GHz frequency band and a millimeter-wave frequency band, e.g., of the 5G spectrum. The antenna 100 may simultaneously or selectively operate in these two frequency bands.

The antenna 100 includes a substrate 102 in the form of a circular disc. The substrate 102 is a single-layer substrate, e.g., PCB substrate. The circular disc may include a small central through-hole 102H.

The antenna 100 also includes a dielectric resonator element 104 arranged on the substrate 102. The dielectric resonator element 104 includes an annular cylinder body 104B with a cylindrical through-hole 104H arranged generally centrally of the body 104B. The body 104B or the annular cylinder is formed by wall with substantially the same thickness. The dielectric resonator element 104 can be made of dielectric materials, such as but not limited to glass materials or other transparent or translucent dielectric materials. The radius of the dielectric resonator element 104 is smaller than the radius of the circular disc of the substrate 102. The dielectric resonator element 104 is arranged generally centrally on the substrate 102.

The antenna 100 also includes a feed circuit 106. The feed circuit 106 is operably coupled with the dielectric resonator element 104 and is operable to facilitate operation of the omnidirectional antenna 100 in the sub-6 GHz frequency band. The feed circuit 106 includes conductors, e.g., conductor strips, which may be printed on the substrate 102. The conductors of the feed circuit 106 defines a 1-to-4 power divider circuit 106P and four arc-shaped conductive segments 106S connected with the power divider circuit 106P. The arc-shaped conductive segments 106S are disposed between the substrate 102 and the dielectric resonator element 104, and are angularly spaced apart generally equally on an annular path or trajectory. The antenna 100 has a port 108 that electrically connects with the power divider circuit 106P. The port 108 is arranged generally perpendicular to and near a periphery of the substrate 102, on another side of the substrate 102 relative to the dielectric resonator element 104. The port 108 is for connection with an external feed (e.g., coaxial cable) for operation at the sub-6 GHz frequency band. The port 108 may be referred to as a sub-6 GHz port. The feed circuit 106, in particular the arc-shaped conductive segments 106S, are arranged to excite (one or more modes of) the dielectric resonator element 104 to operate in the sub-6 GHz frequency band.

The antenna 100 further includes a feed probe 110. The feed probe 110 is operably coupled with the dielectric resonator element 104 and is operable to facilitate operation of the omnidirectional antenna 100 in the millimeter-wave frequency band. The feed probe 110 extends generally perpendicular to the substrate 102 and is arranged coaxially with and centrally of the cylindrical through-hole 104H, without directly contacting the dielectric resonator element 104. The probe 110 has a shorter axial length than the dielectric resonator element 104. The probe 110 also has a shorter height than the dielectric resonator element 104 (with respect to the substrate 102). The feed probe 110 includes a relatively narrow (smaller radius) cylindrical portion 110C that extends through the central through-hole 102H of the substrate 102 and a generally tapering portion 110T that tapers to generally widen away from the substrate 102. The generally tapering portion 110T is arranged entirely within the cylindrical through-hole 104H and is arranged to enhance an impedance bandwidth of the antenna 100. The generally tapering portion 110T includes a frusto-conical portion 110TF (tapers to generally widen away from the substrate 102) and a relatively wide (larger radius) cylindrical portion 110TC, wherein the frusto-conical portion 110TF is arranged between the relatively wide cylindrical portion 110TC and the relatively narrow cylindrical portion 110C. The feed probe 110 can be made of metallic material(s). The antenna 100 has a port 112 that electrically connects with the feed probe 110. The port 112 is arranged generally perpendicular to and centrally of the substrate 102, on another side of the substrate 102 relative to the dielectric resonator element 104. The port 112 is for connection with an external feed (e.g., coaxial cable) for operation at the millimeter-wave frequency band. The port 112 may be referred to as a millimeter-wave port. The dielectric resonator element 104 can help to enhance the antenna gain in the millimeter-wave frequency band.

The two bands of the antenna 100 can be independently tuned or adjusted, e.g., to design and manufacture antenna that operates at other frequency ranges or bands.

An omnidirectional antenna prototype was fabricated in accordance with the design of the omnidirectional antenna 100, to verify the design. In the omnidirectional antenna prototype, the dielectric resonator element was fabricated with K9 glass, whereas the feed circuit is printed on the substrate that has a dielectric constant of $\varepsilon_r$=3.55 and thickness of $h_s$=1.524 mm.

The reflection coefficient of the omnidirectional antenna prototype was measured using an Agilent 4-port network analyzer E5071C, and the radiation pattern and antenna gain of the omnidirectional antenna prototype were measured using a Satimo Starlab system and a compact range measurement system respectively.

Figure 5A:
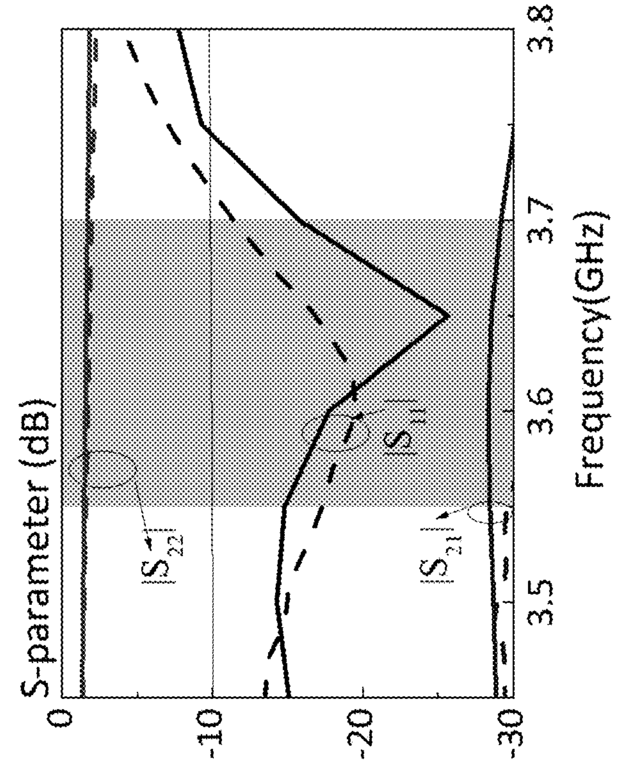
FIG. 5A is a graph showing simulated and measured S-parameters of the omnidirectional antenna of FIG. 1 and a prototype of the omnidirectional antenna of FIG. 1 in the frequency range of 3.45 GHz to 3.8 GHz.
Figure 5B:
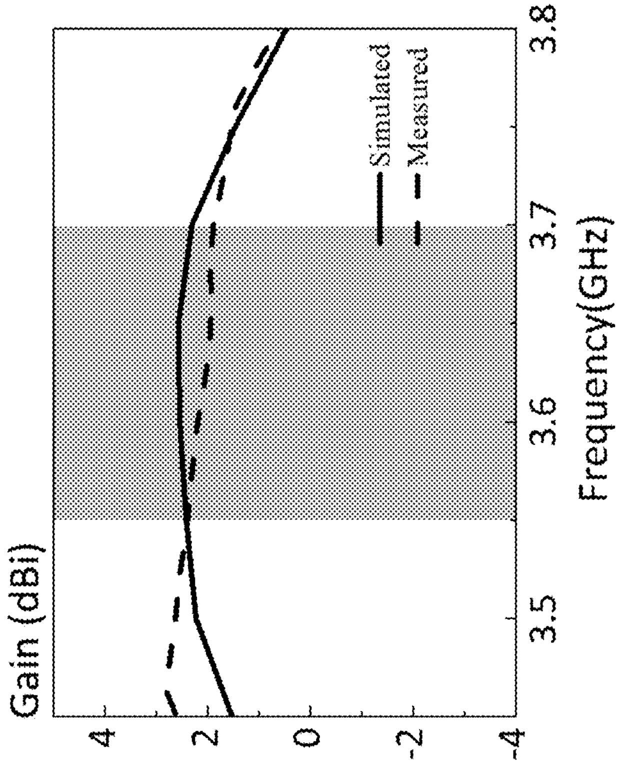
FIG. 5B is a graph showing simulated and measured antenna gains (at $\phi=0°$, $\theta=60°$) of the omnidirectional antenna of FIG. 1 and the prototype of the omnidirectional antenna of FIG. 1 in the frequency range of 3.45 GHz to 3.8 GHz.

FIGS. 5A and 5B show simulated and measured S-parameters and antenna gains (at $\phi$=0°, $\theta$=60°) of the omnidirectional antenna too and the corresponding omnidirectional antenna prototype in the frequency range of 3.45 GHz to 3.8 GHz. A reasonable agreement between the simulated and measured results is obtained. As shown in FIG. 5A, the measured −10-dB impedance passband of the sub-6 GHz port properly covers the 3.5 GHz bands. Also, the isolation between the two ports (the sub-6 GHz port and the millimeter-wave port) is larger than 28 dB. As shown in FIG. 5B, the measured antenna gain at ($\phi$=0°, $\theta$=60° for the sub-6 GHz port is about 2 dBi.

Figures 6A, 6B:
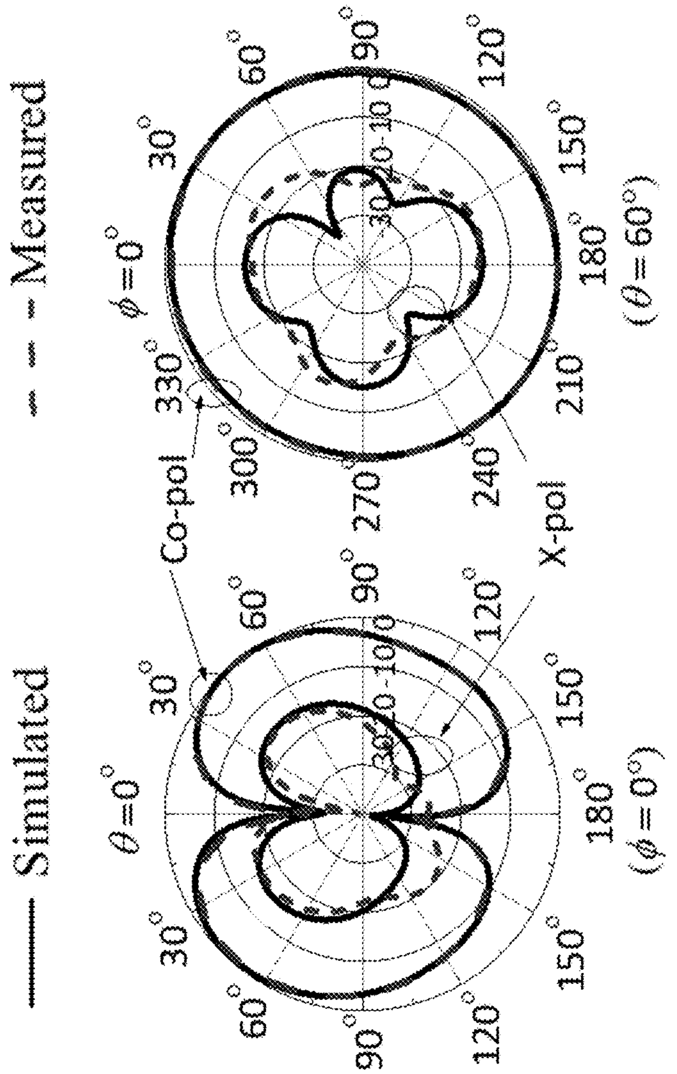
FIG. 6A is a polar diagram showing simulated and measured radiation pattern of the omnidirectional antenna of FIG. 1 and the prototype of the omnidirectional antenna of FIG. 1 at 3.6 GHz and $\phi=0°$.
FIG. 6B is a polar diagram showing simulated and measured radiation pattern of the omnidirectional antenna of FIG. 1 and the prototype of the omnidirectional antenna of FIG. 1 at 3.6 GHz and $\theta=60°$.

FIGS. 6A and 6B illustrate simulated and measured radiation patterns of the omnidirectional antenna too and the corresponding omnidirectional antenna prototype at 3.6 GHz (FIG. 6A: $\phi$=0°; FIG. 6B: $\theta$=60°). A reasonable agreement between the simulated and measured results is obtained. As shown in FIGS. 6A and 6B, the radiation patterns are azimuthally omnidirectional at 3.6 GHz. Also the radiation patterns are generally stable across the passband (not shown here for brevity).

Figure 7A:
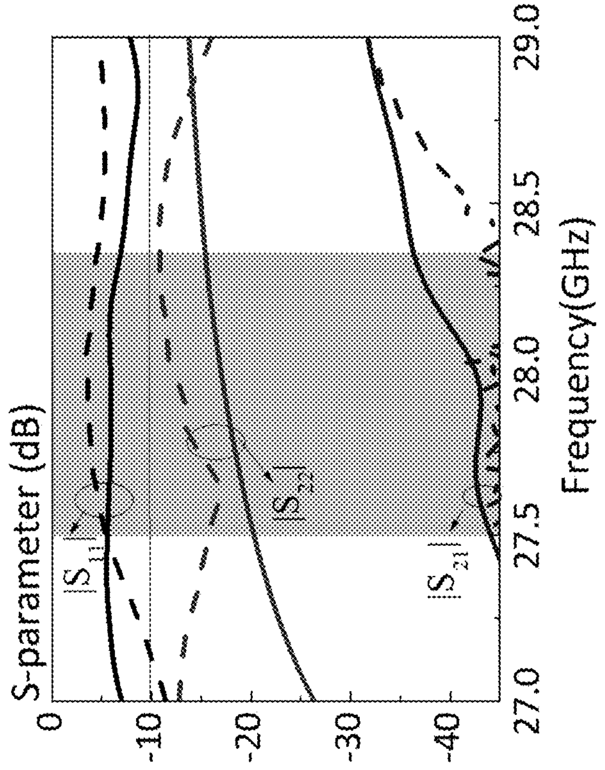
FIG. 7A is a graph showing simulated and measured S-parameters of the omnidirectional antenna of FIG. 1 and the prototype of the omnidirectional antenna of FIG. 1 in the frequency range of 27 GHz to 29 GHz.
Figure 7B:
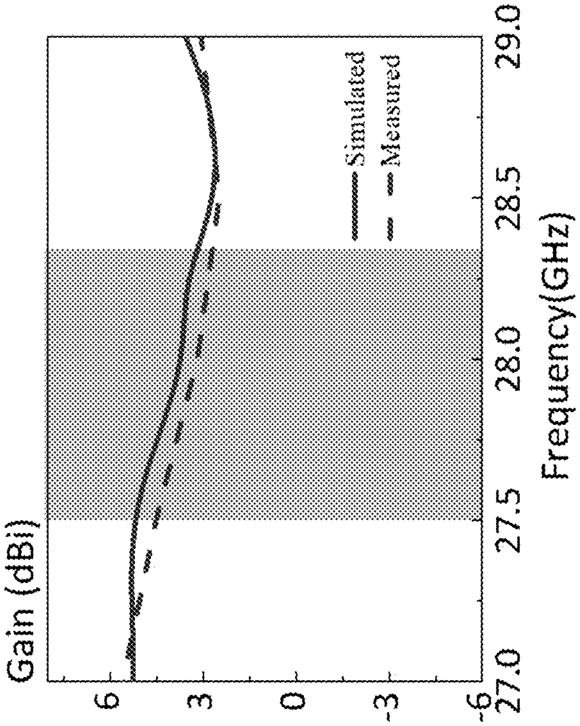
FIG. 7B is a graph showing simulated and measured antenna gains (at $\phi=0°$, $\theta=$) 60° of the omnidirectional antenna of FIG. 1 and the prototype of the omnidirectional antenna of FIG. 1 in the frequency range of 27 GHz to 29 GHz.

FIGS. 7A and 7B show simulated and measured S-parameters and antenna gains (at $\phi$=0°, $\theta$=60°) of the omnidirectional antenna too and the corresponding omnidirectional antenna prototype in the frequency range of 27 GHz to 29 GHz. A reasonable agreement between the simulated and measured results is obtained. As shown in FIG. 7A, the reflection coefficient is lower than −10 dB within 27 GHz to 29 GHz hence properly covers the 28 GHz bands. Within this band, the isolation between the two ports is larger than 40 dB. As shown in FIG. 7B, the measured antenna gain at ($\phi$=0°, $\theta$=60° for the millimeter-wave port is generally larger than 3 dBi within the 28 GHz band. The enhanced antenna gain is due, at least partly, to the configuration of the dielectric resonator element.

Figure 8A:
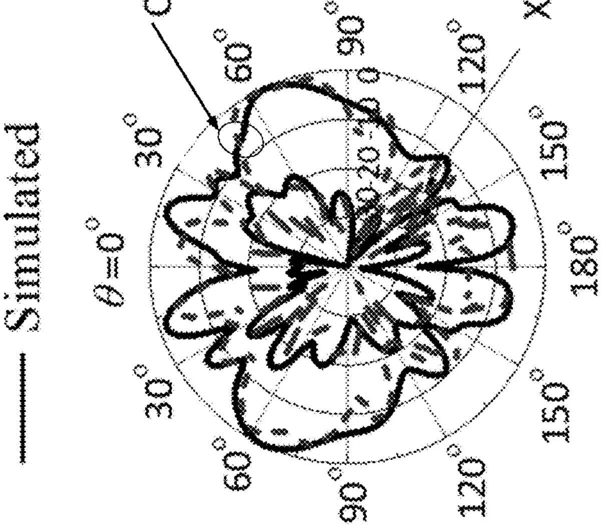
FIG. 8A is a polar diagram showing simulated and measured radiation pattern of the omnidirectional antenna of FIG. 1 and the prototype of the omnidirectional antenna of FIG. 1 at 28 GHz and $\phi=0°$.
Figure 8B:
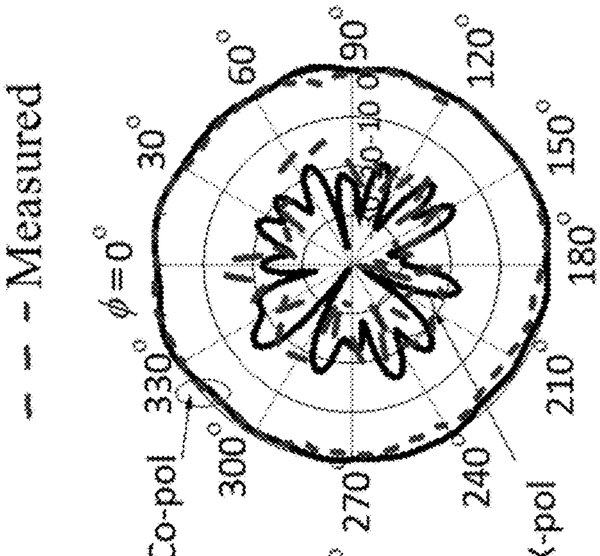
FIG. 8B is a polar diagram showing simulated and measured radiation pattern of the omnidirectional antenna of FIG. 1 and the prototype of the omnidirectional antenna of FIG. 1 at 28 GHz and $\theta=60°$.

FIGS. 8A and 8B illustrate simulated and measured radiation patterns of the omnidirectional antenna too and the corresponding omnidirectional antenna prototype at 28 GHz (FIG. 8A: $\phi$=0°; FIG. 8B: $\theta$=60°. A reasonable agreement between the simulated and measured results is obtained. As shown in FIGS. 8A and 8B, the radiation patterns are azimuthally omnidirectional at 28 GHz. The peak gain is around $\theta$=60°.

The above embodiments have provided a relatively compact dual-frequency-band omnidirectional antenna that is suitable for dual-frequency-band applications. Some embodiments of the invention can be used in the 5G wireless communication devices or systems to provide relatively large signal coverage and relatively stable wireless access for mobile terminals. Some embodiments of the invention can simultaneously support the 5G sub-6 GHz band and millimeter-wave bands with high isolation between the two bands. Some embodiments of the invention can have a compact size and can be made to be aesthetically pleasing, hence can be useful for 5G (or other G) indoor applications. Some embodiments of the invention can be used in compact 5G wireless communication systems or devices, such as routers.

The omnidirectional antenna design in the embodiments of the invention can be applied to an antenna array. The antenna array may include multiple omnidirectional antennas of the embodiments of the invention. The omnidirectional antennas in the array may share the same substrate (e.g., a larger piece of substrate) or they may be arranged on separate substrates (that may be connected directly or indirectly with each other).

It will be appreciated by persons skilled in the art that numerous variations and/or modifications may be made to the invention as shown in the specific embodiments to provide other embodiments of the invention, so long as the omnidirectional antenna can operate in two or more different, optionally spaced apart, frequency bands.

For example, the substrate can take a form, shape, and/or size, different from the substrate in the described embodiments. The substrate need not be a single layer substrate, but instead can be a multi-layer substrate. The substrate need not be in the form of a circular or annular disc. The dielectric resonator element can take a form, shape, and/or size, different from the dielectric resonator element in the described embodiments. The body of the element need not be in the form of an annular cylinder, but could be a cube, a prism, a rectangular prism, a triangular prism, a sphere, a cone, a pyramid, etc., with a hole, not necessarily a through-hole, in it for containing at least part of the feed probe. The dielectric resonator element can be made with any dielectric material. The dielectric material may be transparent or translucent hence more aesthetically appealing. The feed circuit can take a form, shape, and/or size, different from the feed circuit in the described embodiments. The feed circuit need not be printed on the substrate. The feed circuit can be formed by any types of conductors, not necessarily conductor strips. The form, shape, and/or size of the conductor strips of the feed circuit can be different from those illustrated. The power divider circuit need not be provided by conductive strips. The power divider circuit can be a 1-to-X (X is any integer larger than 1) power divider circuit. The number of arc-shaped conductive segments can be more than or equal to two, not necessarily four. The feed probe take a form, shape, and/or size, different from the feed probe in the described embodiments. The impedance bandwidth enhancement portion of the feed probe need not be conical or frusto-conical. The impedance bandwidth enhancement portion can include a narrower end and a wider end and a transition between the narrower end and the wider end that can but need not be strictly continuously widening. The feed probe can be one or more additional portions, such as but not limited to cylindrical portions. The port for the feed circuit and the dielectric resonator element can be but need not be arranged on opposite sides of the substrate. The feed port for the feed probe and the dielectric resonator element can be but need not be arranged on opposite sides of the substrate. In various embodiments, the omnidirectional antenna can be arranged to operate in only two or more than two different, optionally spaced apart, frequency bands. The omnidirectional antenna need not be operable in the sub-6 GHz frequency band and/or the millimeter-wave frequency band of the 5G spectrum, and instead can operate in different frequency band(s).

The described embodiments of the invention should therefore be considered in all respects as illustrative, not restrictive.

The invention claimed is:

1. An omnidirectional antenna, comprising:

a substrate;

a dielectric resonator element arranged on the substrate;

a feed circuit operably coupled with the dielectric resonator element and operable to facilitate operation of the omnidirectional antenna in a first frequency band; and a feed probe operably coupled with the dielectric resonator element and operable to facilitate operation of the omnidirectional antenna in a second frequency band different from the first frequency band;

wherein the feed probe extends generally perpendicular to the substrate, and comprises an impedance bandwidth enhancement portion including a generally tapering portion that tapers to generally widen away from the substrate.

2. The omnidirectional antenna of claim 1, wherein the first frequency band is spaced apart from the second frequency band.

3. The omnidirectional antenna of claim 1, wherein the first frequency band comprises a sub-6 GHz frequency band.

4. The omnidirectional antenna of claim 3, wherein the second frequency band comprises a millimeter-wave frequency band.

5. The omnidirectional antenna of claim 1, wherein the feed circuit and the feed probe are arranged to operate simultaneously to facilitate simultaneous operation of the omnidirectional antenna in the first frequency band and the second frequency band.

6. The omnidirectional antenna of claim 1, wherein the dielectric resonator element comprises a body with a hole, and the feed probe is arranged at least partly in the hole.

7. The omnidirectional antenna of claim 6, wherein the hole is arranged centrally of the body.

8. The omnidirectional antenna of claim 6, wherein the hole is a through-hole.

9. The omnidirectional antenna of claim 8, wherein the body with through-hole is in the form of an annular cylinder.

10. The omnidirectional antenna of claim 1, wherein the dielectric resonator element is made at least partly of glass material.

11. The omnidirectional antenna of claim 6, wherein the feed probe is arranged coaxially with the hole.

12. The omnidirectional antenna of claim 1, wherein the generally tapering portion comprises a conical portion or a frusto-conical portion that tapers to widen away from the substrate.

13. The omnidirectional antenna of claim 1, wherein the feed probe comprises a metallic probe.

14. The omnidirectional antenna of claim 1, wherein the feed circuit comprises conductor strips.

15. The omnidirectional antenna of claim 14, wherein the conductor strips are printed on the substrate.

16. An omnidirectional antenna, comprising:

a substrate;

a dielectric resonator element arranged on the substrate;

a feed circuit operably coupled with the dielectric resonator element and operable to facilitate operation of the omnidirectional antenna in a first frequency band, the feed circuit comprising conductor strips: and a feed probe operably coupled with the dielectric resonator element and operable to facilitate operation of the omnidirectional antenna in a second frequency band different from the first frequency band, wherein the conductor strips define, at least, a power divider circuit and a plurality of arc-shaped conductive segments operably connected with the power divider circuit.

17. The omnidirectional antenna of claim 16, wherein the plurality of arc-shaped conductive segments are disposed between the substrate and the dielectric resonator element.

18. The omnidirectional antenna of claim 17, wherein the plurality of arc-shaped conductive segments are angularly spaced apart.

19. The omnidirectional antenna of claim 18, wherein the plurality of arc-shaped conductive segments are arranged on an annular path.

20. The omnidirectional antenna of claim 1, wherein the omnidirectional antenna is a dual-frequency-band antenna.

21. An antenna array comprising:

a substrate; and a plurality of omnidirectional antenna units, each of the plurality of omnidirectional antenna units including:

a dielectric resonator element arranged on the substrate;

a feed circuit operably coupled with the dielectric resonator element and operable to facilitate operation of the omnidirectional antenna unit in a first frequency band; and a feed probe operably coupled with the dielectric resonator element and operable to facilitate operation of the omnidirectional antenna unit in a second frequency band different from the first frequency band;

wherein the feed probe extends generally perpendicular to the substrate, and comprises an impedance bandwidth enhancement portion including a generally tapering portion that tapers to generally widen away from the substrate.

22. The omnidirectional antenna of claim 16, wherein the conductor strips are printed on the substrate.

* * * * *